(12) United States Patent
Funatsu

(10) Patent No.: US 9,971,445 B2
(45) Date of Patent: May 15, 2018

(54) IMAGE PROCESSING DEVICE, DISPLAY UNIT, AND ELECTRONIC APPARATUS

(71) Applicant: JOLED Inc., Tokyo (JP)

(72) Inventor: Yohei Funatsu, Tokyo (JP)

( * ) Notice: Subject to any disclaimer, the term of this patent is extended or adjusted under 35 U.S.C. 154(b) by 88 days.

(21) Appl. No.: 15/236,965

(22) Filed: Aug. 15, 2016

(65) Prior Publication Data

US 2017/0053618 A1 Feb. 23, 2017

(30) Foreign Application Priority Data

Aug. 20, 2015 (JP) .................. 2015-162425

(51) Int. Cl.
*G06T 15/50* (2011.01)
*G06F 3/041* (2006.01)
*G06F 3/048* (2013.01)

(52) U.S. Cl.
CPC .......... *G06F 3/0416* (2013.01); *G06F 3/0414* (2013.01); *G06F 2203/04102* (2013.01)

(58) Field of Classification Search
CPC combination set(s) only.
See application file for complete search history.

(56) References Cited

U.S. PATENT DOCUMENTS

| 2003/0207946 | A1 | 11/2003 | Park et al. | |
| 2013/0127980 | A1* | 5/2013 | Haddick | G06F 3/013 348/14.08 |
| 2013/0141435 | A1* | 6/2013 | Cho | G06T 15/50 345/426 |

* cited by examiner

*Primary Examiner* — Wesner Sajous
(74) *Attorney, Agent, or Firm* — Michael Best & Friedrich LLP

(57) ABSTRACT

An image processing device includes an image processor. The image processor performs an image processing on an image signal on a basis of a result of detection of a contact condition in which a user makes contact with a display section. The image processing includes an enhancement processing performed on the image signal in accordance with the contact condition.

13 Claims, 10 Drawing Sheets

IMAGE PROCESSING DEVICE, DISPLAY UNIT, AND ELECTRONIC APPARATUS

CROSS REFERENCE TO RELATED APPLICATIONS

This application claims the benefit of Japanese Priority Patent Application JP2015-162425 filed on Aug. 20, 2015, the entire contents of which are incorporated herein by reference.

BACKGROUND

The disclosure relates to an image processing device that performs an image processing on an image signal, a display unit provided with the image processing device, and an electronic apparatus.

Various display units and an image processing device applicable to the various display units have been proposed, as disclosed, for example, in United States Patent Application Publication No. 2003/0207946.

SUMMARY

It is generally preferred to improve a sense of presence that is provoked during image display performed by a display unit. Accordingly, it is preferable to provide a technique to improve the sense of presence that is provoked during the image display.

It is desirable to provide an image processing device, a display unit, and an electronic apparatus that make it possible to improve a sense of presence that is provoked during image display.

An image processing device according to an illustrative embodiment of the disclosure includes an image processor that performs an image processing on an image signal on a basis of a result of detection of a contact condition in which a user makes contact with a display section. The image processing includes an enhancement processing performed on the image signal in accordance with the contact condition.

A display unit according to an illustrative embodiment of the disclosure includes a display section, a detector, and an image processor. The detector performs detection of a contact condition in which a user makes contact with the display section. The image processor performs an image processing on an image signal on a basis of a result of the detection of the contact condition performed by the detector. The image processing includes an enhancement processing performed on the image signal in accordance with the contact condition.

An electronic apparatus according to an illustrative embodiment of the disclosure includes a display unit that includes a display section, a detector, and an image processor. The detector performs detection of a contact condition in which a user makes contact with the display section. The image processor performs an image processing on an image signal on a basis of a result of the detection of the contact condition performed by the detector. The image processing includes an enhancement processing performed on the image signal in accordance with the contact condition.

DESCRIPTION

Some example embodiments of the disclosure are described below in detail with reference to the drawings. The description is given in the following order.

1. Example Embodiment (An example involving enhancement processings on a three-dimensional effect and contrast, and a definition compensation processing)
2. Modifications
    Modification 1 (An example involving the enhancement processings on the three-dimensional effect and the contrast)
    Modification 2 (An example involving the enhancement processing on the three-dimensional effect and the definition compensation processing)
    Modification 3 (An example involving the enhancement processing on the three-dimensional effect)
3. Application Examples (Application examples in which a display unit, etc. according to any one of the example embodiment and Modifications 1 to 3 is applied to an electronic apparatus)

4. Other Modifications

1. Example Embodiment

Overall Configuration Example

Figure 1:
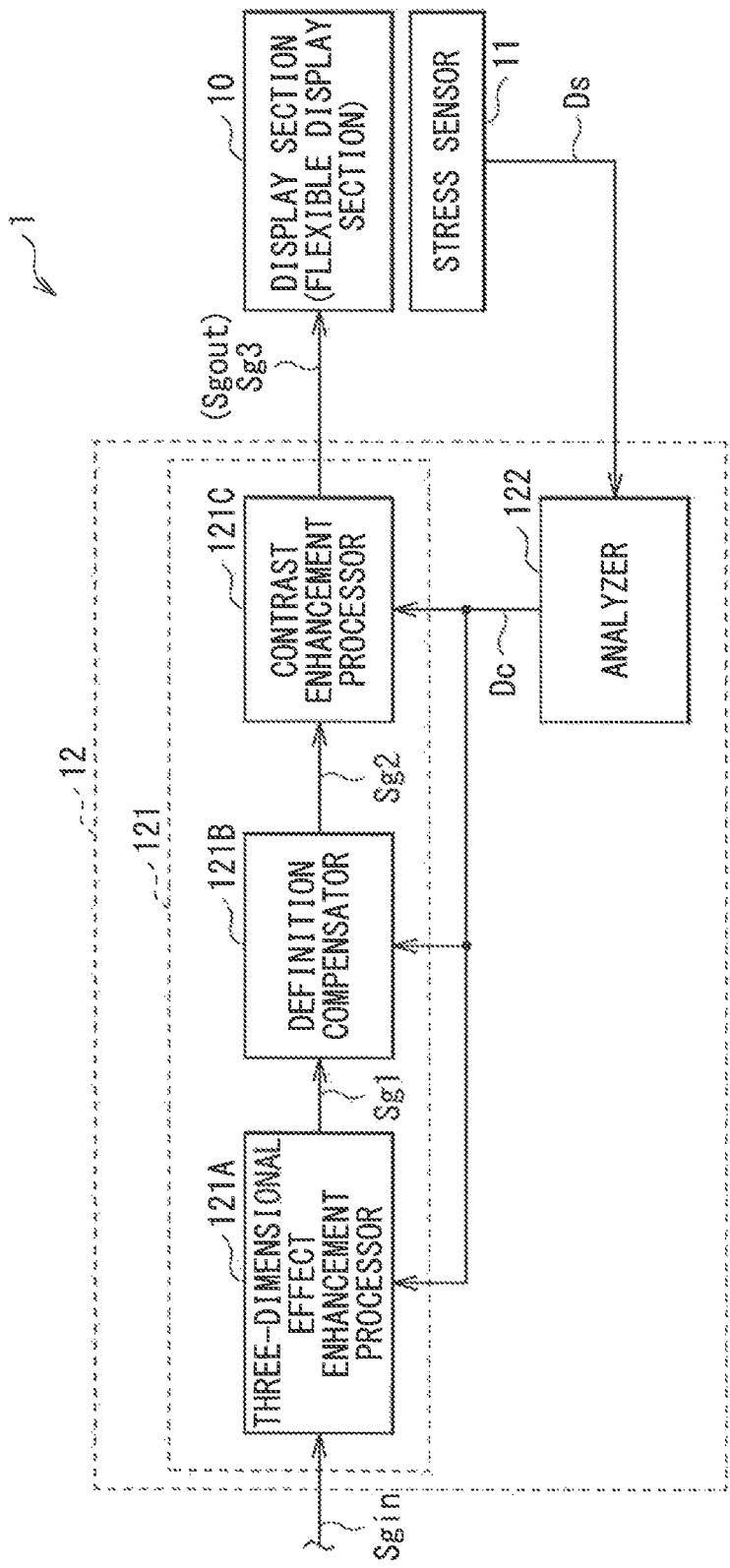
FIG. 1 is a block diagram illustrating an outline configuration example of a display unit according to an example embodiment of the disclosure.

FIG. 1 is a block diagram illustrating an outline configuration example, or an overall configuration example, of a display unit according to an example embodiment of the disclosure, i.e., of a display unit 1. Referring to FIG. 1, the display unit 1 may include a display section 10, a stress sensor 11, and an image processing device 12. The display section 10 may be a flexible display section. The image processing device 12 may correspond to an "image processing device" in one specific but non-limiting embodiment of the disclosure.

(Display Section 10)

The display section 10 may display an image on the basis of an image signal Sgout (Sg3) that is supplied from an image processor 121 included in the image processing device 12 which will be described later. The display section 10 may be a flexible display section, or a flexible display, that has flexibility in the present example embodiment. The display section 10 may include a plurality of pixels, for example. The pixels may each include a display element. Non-limiting examples of the display element may include a liquid crystal element and a self-emitting element such as an organic electroluminescence (EL) element. The display section 10 may correspond to a "display section" in one specific but non-limiting embodiment of the disclosure.

(Stress Sensor 11)

The stress sensor 11 may be a sensor that detects a stress generated on the display section 10. The stress sensor 11 may be any type of a stress sensor. A stress Ds detected by the stress sensor 11 may be supplied to an analyzer 122 included in the image processing device 12 which will be described later. The stress sensor 11 may correspond to a "stress sensor" in one specific but non-limiting embodiment of the disclosure.

(Image Processing Device 12)

Referring to FIG. 1, the image processing device 12 may perform a predetermined image processing on an image signal Sgin supplied from outside, thereby generating the foregoing image signal Sgout. The image signal Sgin may be an input signal. The image signal Sgout may be an output image signal. The image processing device 12 may include the image processor 121 and the analyzer 122 in the present example embodiment. The image processor 121 may actually perform the image processing on the image signal Sgin. The analyzer 122 may perform a predetermined analysis processing on the basis of the stress Ds detected by the stress sensor 11.

The image processor 121 may correspond to an "image processor" in one specific but non-limiting embodiment of the disclosure. The analyzer 122 may correspond to an "analyzer" in one specific but non-limiting embodiment of the disclosure. The analyzer 122 and the foregoing stress sensor 11 may correspond to a "detector", which performs detection of a contact condition in which a user makes contact with the display section, in one specific but non-limiting embodiment of the disclosure.

Referring to FIG. 1, the image processor 121 may include a three-dimensional effect enhancement processor 121A, a definition compensator 121B, and a contrast enhancement processor 121C, in the present example embodiment. The image processor 121 performs the image processing on the image signal Sgin on the basis of a result of detection of the contact condition in which the user using the display unit 1 makes contact with the display section 10, which will be described later in detail. More specifically, the image processor 121 performs, as the image processing, an enhancement processing on the image signal Sgin in accordance with the contact condition in which the user makes contact with the display section 10. The image processor 121 may perform the enhancement processing utilizing a result of detection of a stress that is generated on the display section 10 due to the contact made by the user with the display section 10. The foregoing stress may be the stress Ds detected by the stress sensor 11, in the present example embodiment.

The three-dimensional effect enhancement processor 121A may perform a predetermined three-dimensional effect enhancement processing on the image signal Sgin supplied thereto, thereby generating an image signal Sg1 that has been subjected to the three-dimensional effect enhancement processing and outputting the generated image signal Sg1. The three-dimensional effect enhancement processing may be a processing that enhances a three-dimensional effect of an image or a picture expressed on the basis of the image signal Sgin, in accordance with the contact condition in which the user makes contact with the display section 10, which will be described later in detail.

The definition compensator 121B may perform a predetermined definition compensation processing on the image signal Sg1 supplied thereto, thereby generating an image signal Sg2 that has been subjected to the definition compensation processing and outputting the generated image signal Sg2. The definition compensation processing may be a processing that compensates for decreased resolution of the image due to the foregoing three-dimensional effect enhancement processing, which will be described later in detail. In other words, the definition compensation processing may be a processing that compensates for decreased resolution of an image expressed on the basis of the image signal Sg1.

The contrast enhancement processor 121C may perform a predetermined contrast enhancement processing on the image signal Sg2 supplied thereto, thereby generating the image signal Sg3 that has been subjected to the contrast enhancement processing and outputting the generated image signal Sg3 (Sgout). The contrast enhancement processing may be a processing that enhances one or both of luminance contrast and chroma contrast in accordance with the contact condition in which the user makes contact with the display section 10, which will be described later in detail. The contact enhancement processing may be a processing that enhances both of the luminance contrast and the chroma contrast, in the present example embodiment.

Details of the respective image processings performed by the image processor 121 will be described later with reference to FIGS. 9 to 11.

The analyzer 122 may perform analysis of a result Dc of the detection of the contact condition in which the user makes contact with the display section 10, on the basis of the stress Ds detected by the stress sensor 11. The analyzer 122 may supply the result Dc of the detection of the foregoing contact condition, or the result of the analysis, to the image processor 121. More specifically, the analyzer 122 may supply the result Dc of the detection of the foregoing contact condition, or the result of the analysis, to each of the three-dimensional effect enhancement processor 121A, the definition compensator 121B, and the contrast enhancement processor 121C.

[Detailed Configuration Example of Analyzer 122]

Figure 2:
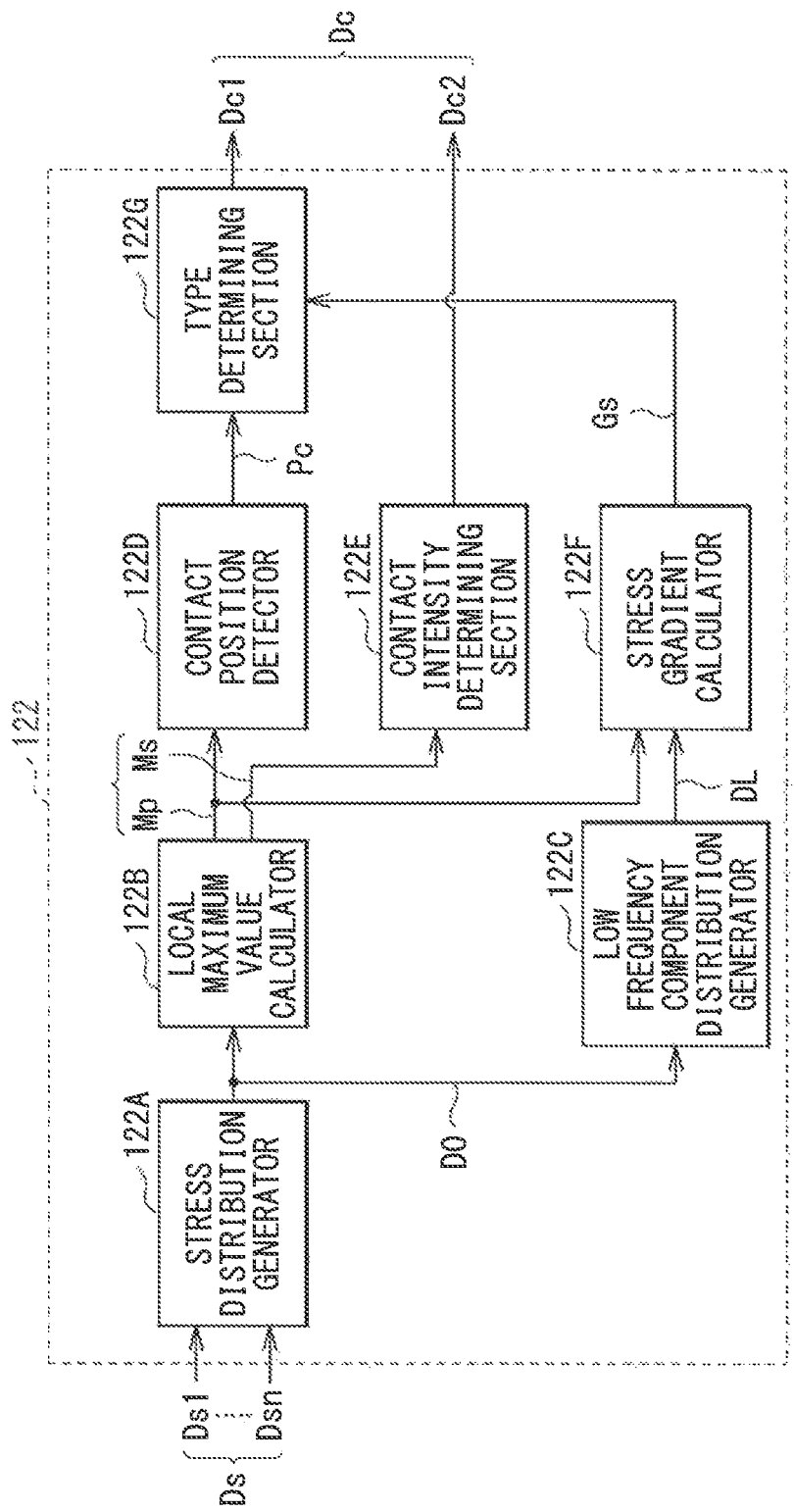
FIG. 2 is a block diagram illustrating a detailed configuration example of an analyzer illustrated in FIG. 1.

FIG. 2 is a block diagram illustrating a detailed configuration example of the analyzer 122. Referring to FIG. 2, the analyzer 122 may include a stress distribution generator 122A, a local maximum value calculator 122B, a low frequency component distribution generator 122C, a contact position detector 122D, a contact intensity determining section 122E, a stress gradient calculator 122F, and a type determining section 122G in the present example embodiment.

The stress distribution generator 122A may generate stress distribution D0 in the display section 10 on the basis of the stress Ds detected by the stress sensor 11. The stress distribution D0 may be two-dimensional distribution of stress values in a display surface. It is to be noted that, referring to FIG. 2, the stress Ds detected by the stress sensor 11 may include one-dimensional data (Ds1, Ds2, . . . , Dsn) of a result of detection of the stress for the respective plurality of lines in the display surface. The plurality of lines may be n-number of lines in the present example embodiment, where n is an integer that is equal to or greater than 2.

The local maximum value calculator 122B may determine, or calculate, each of a coordinate Mp of a local maximum value and magnitude Ms of the local maximum value in the stress distribution D0, on the basis of the stress distribution D0 generated by the stress distribution generator 122A.

The low frequency component distribution generator 122C may determine, or generate, low frequency component distribution DL of the stress in the display section 10, or in the display surface, on the basis of the stress distribution D0 generated by the stress distribution generator 122A.

The contact position detector 122D may determine, or detect, a contact position Pc of the user in the display section 10, or in the display surface, on the basis of the coordinate Mp of the local maximum value determined by the local maximum value calculator 122B. The contact position Pc of the user refers to a position at which the user makes contact with the display section 10.

The contact intensity determining section 122E may determine contact intensity Dc2 of the user with respect to the display section 10, or the display surface, on the basis of the magnitude Ms of the local maximum value determined by the local maximum value calculator 122B. The contact intensity Dc2 of the user refers to intensity by which the user makes contact with the display section 10. It is to be noted that the contact intensity Dc2 may be included in the foregoing result Dc of the detection of the contact condition in the present example embodiment, as illustrated in FIG. 2.

The stress gradient calculator 122F may determine, or calculate, a stress gradient Gs in the display section 10, or in the display surface, on the basis of the coordinate Mp of the local maximum value determined by the local maximum value calculator 122B and the low frequency component distribution DL of the stress generated by the low frequency component distribution generator 122C.

The type determining section 122G may determine the type Dc1 of the contact condition in which the user makes contact with the display section 10, or the display surface, on the basis of the contact position Pc of the user detected by the contact position detector 122D and the stress gradient Gs determined by the stress gradient calculator 122F. It is to be noted that the type Dc1 of the contact condition may be included in the foregoing result Dc of the detection of the contact condition in the present example embodiment, as illustrated in FIG. 2.

Thus, the analyzer 122 may generate the stress distribution D0 on the basis of the stress Ds detected by the stress sensor 11. The analyzer 122 may also acquire, as the foregoing result Dc of the detection of the contact condition, the type Dc1 and the contact intensity Dc2 of the contact condition by means of analysis on the basis of the generated stress distribution D0, and supply the acquired type Dc1 and the acquired contact intensity Dc2 to the image processor 121. Details of each of the foregoing processings performed by the analyzer 122 will be described later with reference to FIGS. 3 to 8.

[Operation]

(A. Basic Operation)

Referring to FIG. 1, the display unit 1 may have a configuration in which the image processing device 12 performs the predetermined image processing on the image signal Sgin supplied from the outside, thereby generating the image signal Sgout. Upon performing the foregoing image processing, the image processing device 12 may utilize the stress Ds detected by the stress sensor 11. More specifically, the analyzer 122 included in the image processing device 12 may perform the predetermined analysis processing on the basis of the stress Ds detected by the stress sensor 11, and the image processor 121 included in the image processing device 12 may perform the image processing on the image signal Sgin utilizing the result of the analysis processing, or the result of the analysis. Further, the display section 10 may perform image display on the basis of the image signal Sgout that is supplied from the image processing device 12.

(B. Detailed Operation)

Next, a detailed operation example of the display unit 1 is described with reference to FIGS. 1, 2, and 3 to 11.

(B-1. Analysis Processing Operation)

First, an analysis processing operation of the foregoing analyzer 122 is described in detail with reference to FIGS. 1, 2, and 3 to 8.

Figure 3:
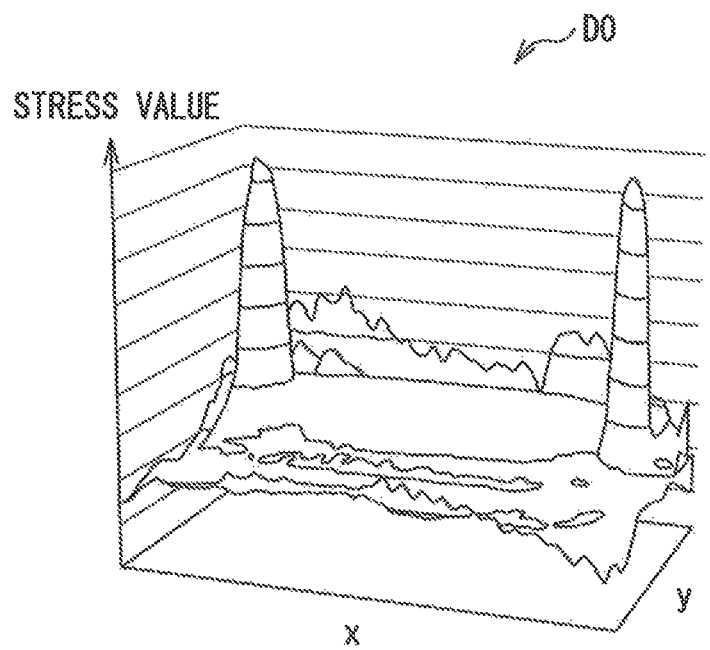
FIG. 3 is a schematic diagram illustrating an example of stress distribution referred to in FIG. 2.

First, the stress distribution generator 122A in the analyzer 122 may generate the stress distribution D0 in the display section 10, on the basis of the stress Ds detected by the stress sensor 11, as schematically illustrated in FIG. 3, for example. The stress distribution D0 may be the two-dimensional distribution of stress values in the display surface. More specifically, the stress Ds detected by the stress sensor 11 may include the one-dimensional data (Ds1, Ds2, Dsn) of the result of the detection of the stress for the respective plurality of lines in the display surface, in the present example embodiment. Therefore, the stress distribution generator 122A may perform an image interpolation processing on the data, thereby generating the two-dimensional stress distribution D0. The foregoing image interpolation processing may be any of a linear interpolation processing and a non-linear interpolation processing.

Figure 4:
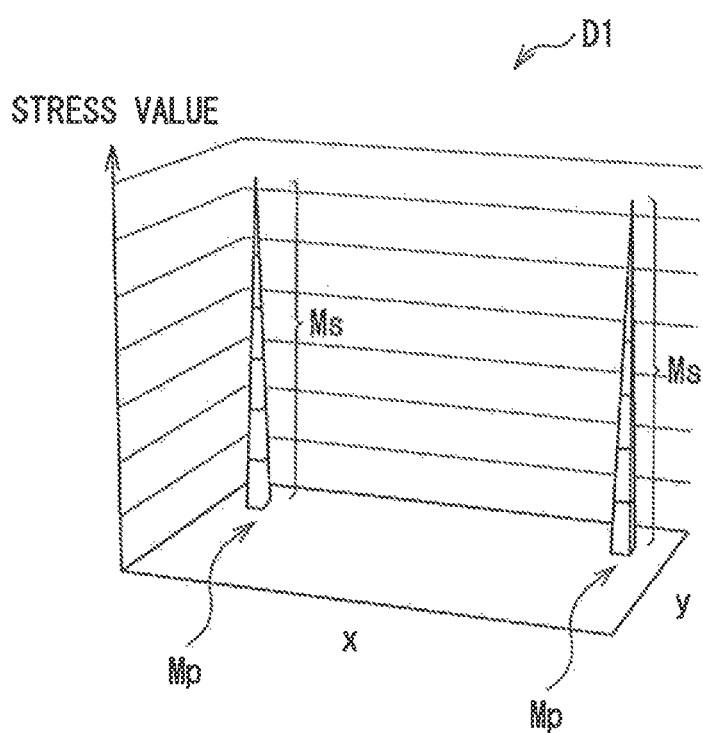
FIG. 4 is a schematic diagram illustrating an example of local maximum value distribution referred to in FIG. 2.

Thereafter, the local maximum value calculator 122B may determine each of the coordinate Mp of the local maximum value and the magnitude Ms of the local maximum value in the stress distribution D0, as schematically illustrated in FIG. 4, for example. It is to be noted that the stress distribution D0 in the example illustrated in FIG. 4 involves the local maximum values at two different positions. In this case, the local maximum value calculator 122B may perform a differencing processing on the supplied data, or the supplied image, of the stress distribution D0 and data of the stress distribution D0 that has been subjected to a low pass filter (LPF) processing, for example. The local maximum value calculator 122B may perform thereafter a predetermined threshold determination processing and a predetermined maximum value filter processing on the data that has been subjected to the differencing processing, thereby determining each of the coordinate Mp of the local maximum value and the magnitude Ms of the local maximum value.

Figure 5:
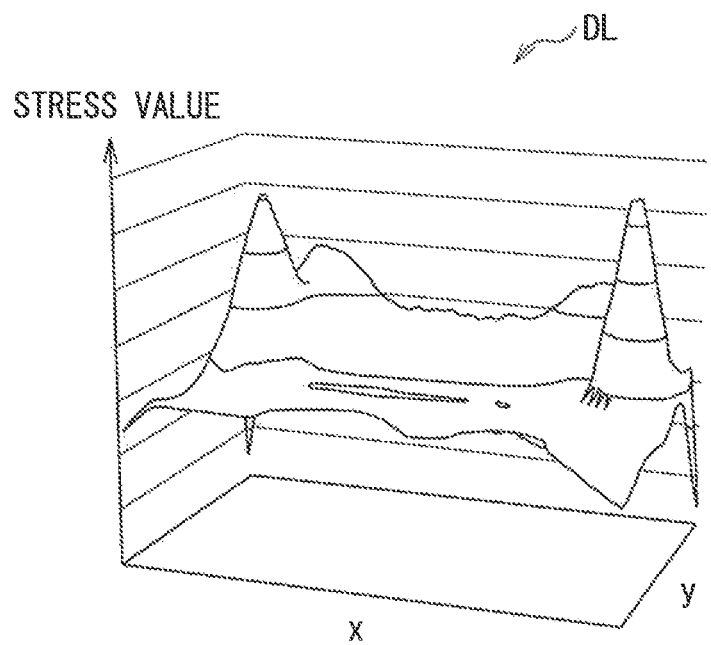
FIG. 5 is a schematic diagram illustrating an example of low frequency component distribution referred to in FIG. 2.

The low frequency component distribution generator 122C may determine the low frequency component distribution DL of the stress in the display section 10, or in the display surface, on the basis of the stress distribution D0, as schematically illustrated in FIG. 5, for example. More specifically, the low frequency component distribution generator 122C may generate the low frequency component distribution DL using the data of the stress distribution D0 that has been subjected to the LPF processing, for example. Upon generating the low frequency component distribution DL, the low frequency component distribution generator 122C may use the data that has been subjected to the LPF processing and is used by the local maximum value calculator 122B as described above. For example, the "low frequency component" as used herein may be set as follows, taking into consideration an arrangement spacing of the stress sensor 11 and magnitude of a wavelength of a waveform detected by the stress sensor 11, i.e., a detected waveform. More specifically, for example, when the arrangement spacing of the stress sensor 11 is 5 mm, the "low frequency component" may be set as a wavelength component, included in the foregoing detected waveform, that is several times the arrangement spacing or shorter. For example, the "low frequency component" may be set as a wavelength component that is five times the arrangement spacing or shorter. Such a wavelength component may be a wavelength component of 25 mm or shorter, for example. It is to be noted that the foregoing setting of the "low frequency component" may be determined on the basis of a contact length of a finger of the user related to the foregoing local maximum value, and the arrangement spacing of the stress sensor 11. In other words, the setting of the "low frequency component" may be determined on the basis of the arrangement spacing of the stress sensor 11 that is so determined that the stress sensor 11 sufficiently covers the contact length of the finger of the user.

Thereafter, the contact position detector 122D may determine the contact position Pc of the user in the display section 10, or in the display surface, on the basis of the coordinate Mp of the local maximum value determined by the local maximum value calculator 122B. More specifically, the contact position detector 122D may presume that the coordinate Mp of the local maximum value corresponds to a position of the user's thumb, thereby detecting the foregoing contact position Pc, for example.

Figure 6:
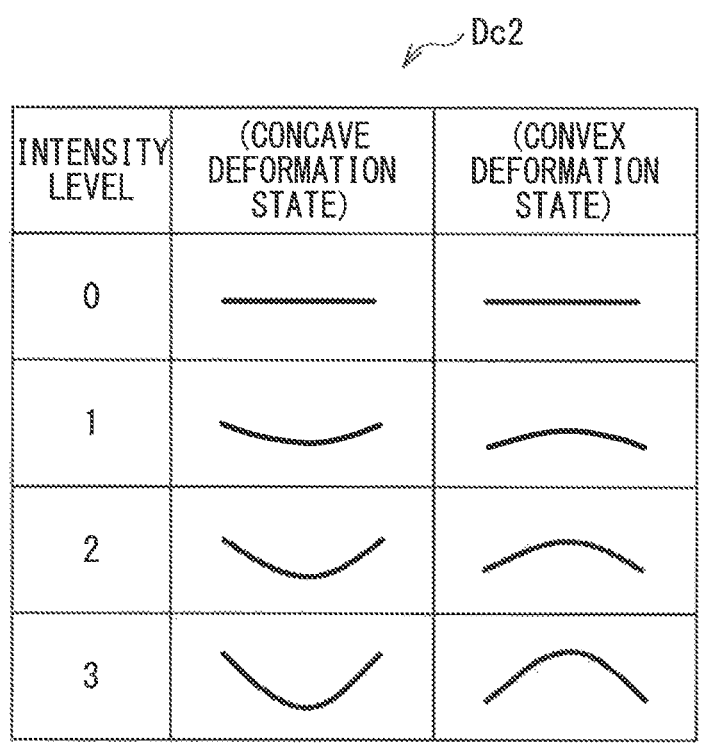
FIG. 6 is a schematic diagram illustrating an example of contact intensity referred to in FIG. 2.

The contact intensity determining section 122E may determine the contact intensity Dc2 of the user with respect to the display unit 10, or the display surface, on the basis of the magnitude Ms of the local maximum value determined by the local maximum value calculator 122B, as schematically illustrated in FIG. 6, for example. The contact intensity determining section 122E may use a predetermined look up table (LUT), a predetermined conversion expression, etc. to determine the foregoing contact intensity Dc2, for example. It is to be noted that an intensity level of the contact intensity Dc2 may be classified into four levels from "0 (zero)" to "3" for each of a concave deformation state and a convex deformation state which will be described later, in the example illustrated in FIG. 6. The intensity level of the contact intensity Dc2 may be classified for each of variations of the type Dc1 of the contact condition, for example.

Figure 7A:
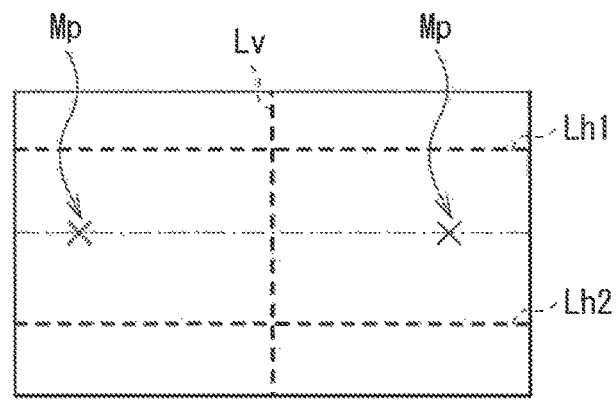
FIG. 7A is a schematic diagram illustrating an example of a method of calculating a stress gradient referred to in FIG. 2.

The stress gradient calculator 122F may determine the stress gradient Gs in the display section 10, or in the display surface, on the basis of the coordinate Mp of the local maximum value determined by the local maximum value calculator 122B and the low frequency component distribution DL of the stress generated by the low frequency component distribution generator 122C, as schematically illustrated in FIG. 7A, for example. More specifically, the stress gradient calculator 122F may use, as a reference, a straight line in a horizontal direction that passes through both the two coordinates Mp of the local maximum values. The foregoing straight line is illustrated as a dashed and dotted line in FIG. 7A. The stress gradient calculator 122F may thus calculate the stress gradient Gs along each of two gradient calculation lines Lh1 and Lh2 and one gradient calculation line Lv. The gradient calculation lines Lh1 and Lh2 may extend in the horizontal direction. The gradient calculation line Lv may extend in a vertical direction.

Figure 7B:
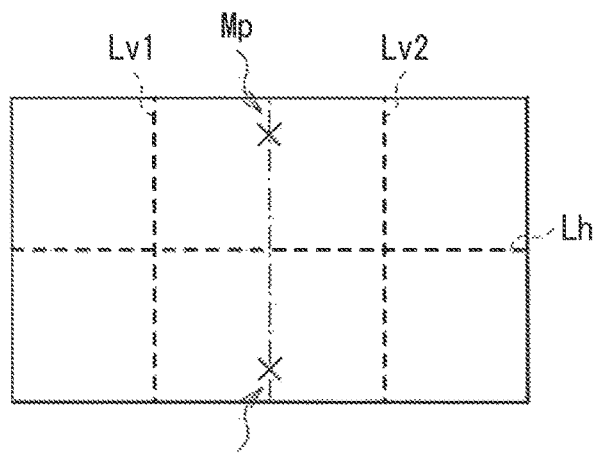
FIG. 7B is a schematic diagram illustrating another example of the method of calculating the stress gradient referred to in FIG. 2.
Figure 7C:
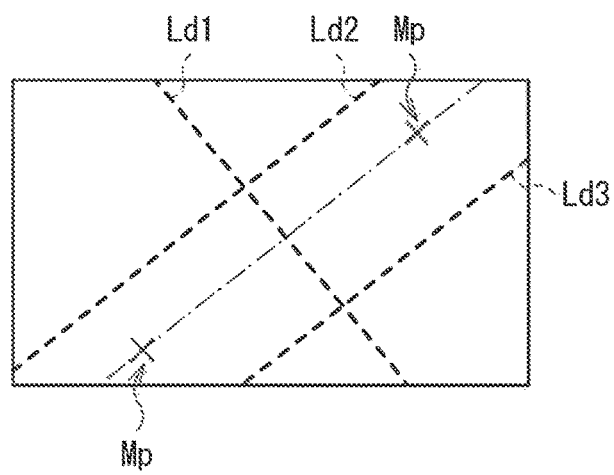
FIG. 7C is a schematic diagram illustrating yet another example of the method of calculating the stress gradient referred to in FIG. 2.
Figure 8:
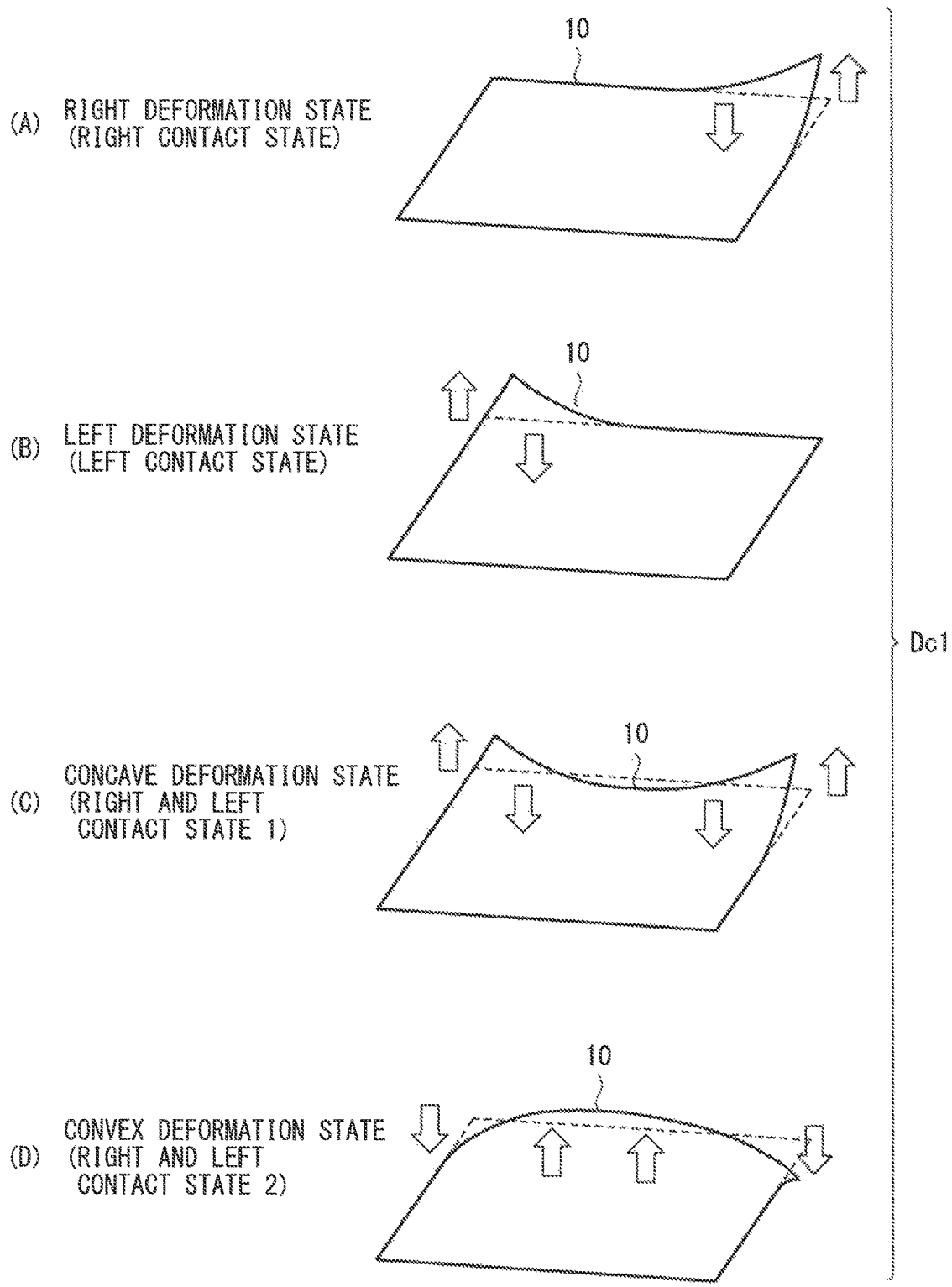
FIG. 8 is a schematic diagram illustrating an example of a method of determining a type of a contact condition referred to in FIG. 2.

It is to be noted that the stress gradient Gs may be calculated by a method schematically illustrated in each of FIGS. 7B and 7C, for example. More specifically, according to the example method illustrated in FIG. 7B, the stress gradient calculator 122F may use, as a reference, a straight line in the vertical direction that passes through both the two coordinates Mp of the local maximum values. The foregoing straight line is illustrated as a dashed and dotted line in FIG. 7B. The stress gradient calculator 122F may thus calculate the stress gradient Gs along each of two gradient calculation lines Lv1 and Lv2 and one gradient calculation line Lh. The gradient calculation lines Lv1 and Lv2 may extend in the vertical direction. The gradient calculation line Lh may extend in the horizontal direction. Alternatively, according to the example method illustrated in FIG. 7C, the stress gradient calculator 122F may use, as a reference, a straight line in an oblique direction that passes through both the two coordinates Mp of the local maximum values. The foregoing straight line is illustrated as a dashed and dotted line. The stress gradient calculator 122F may thus calculate the stress gradient Gs along each of three gradient calculation lines Ld1, Ld2, and Ld3. The gradient calculation lines Ld1, Ld2, and Ld3 may extend in the oblique direction.

Further, the type determining section 122G may determine the type Dc1 of the contact condition of the user with respect to the display section 10 (the display surface), on the basis of the contact position Pc of the user detected by the contact position detector 122D and the stress gradient Gs determined by the stress gradient calculator 122F, as schematically illustrated in FIGS. 8A to 8D, for example. It is to be noted that the type Dc1 of the foregoing contact condition may be classified into four types in the present example embodiment. That is: a right deformation state, i.e., a right contact state, illustrated in FIG. 8A; a left deformation state, i.e., a left contact state, illustrated in FIG. 8B; a concave deformation state, i.e., a right and left contact state 1, illustrated in FIG. 8C; and a convex deformation state, i.e., a right and left contact state 2, illustrated in FIG. 8D. Utilization of information on each of the contact position Pc and the stress gradient Gs illustrated with arrows in FIGS. 8A to 8D allows for presuming the type of the contact condition of the user. The type of the contact condition of the user may include the contact state and the deformation state, for example. It is therefore possible to determine the type Dc1 of the contact condition in the foregoing manner.

(B-2. Image Processing Operation)

Next, an image processing operation performed by the foregoing image processor 121 is described in detail with reference to FIGS. 1 and 9 to 11.

Figure 9:
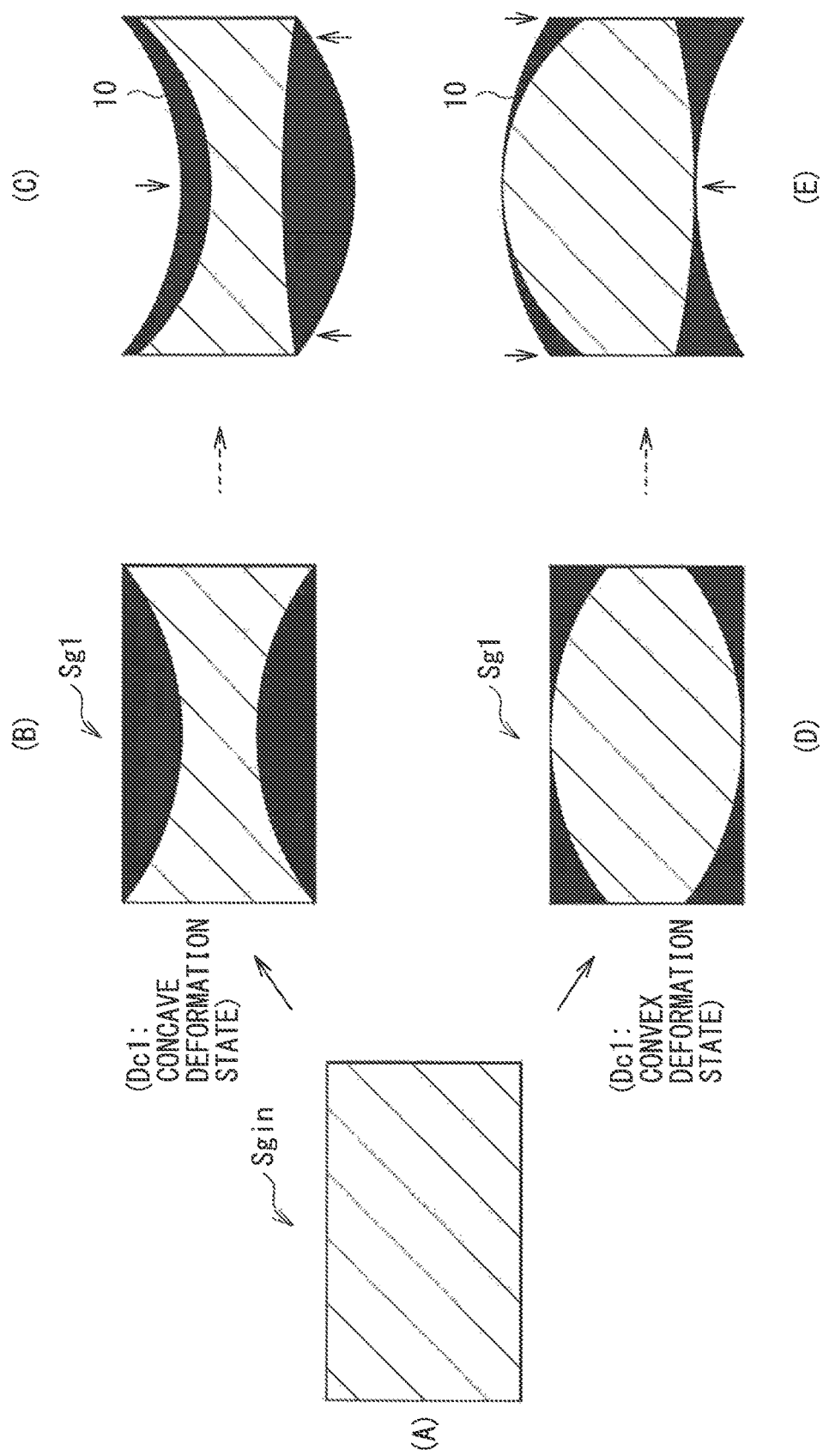
FIG. 9 is a schematic diagram illustrating an example of an enhancement processing of a three-dimensional effect referred to in FIG. 1.

First, the three-dimensional effect enhancement processor 121A in the image processor 121 may perform the three-dimensional effect enhancement processing on the image signal Sgin supplied thereto, thereby generating the image signal Sg1 that has been subjected to the three-dimensional effect enhancement processing, as schematically illustrated in FIG. 9, for example. The three-dimensional effect enhancement processing may be a processing that enhances the three-dimensional effect of the image, or the picture, expressed on the basis of the image signal Sgin, in accordance with the contact condition in which the user makes contact with the display section 10, as described above. More specifically, the three-dimensional effect enhancement processor 121A may perform a processing such as a geometric transformation processing and a processing that adds a motion parallax to thereby perform the foregoing three-dimensional effect enhancement processing, when the image signal Sgin is a two-dimensional (2D) signal, for example. Non-limiting examples of the geometric transformation processing may include a projective transformation processing and a cylindrical transformation processing. Non-limiting example of the processing that adds a motion parallax may include a processing that controls the motion parallax in accordance with the contact condition. Alternatively, the three-dimensional effect enhancement processor 121A may perform a processing that converts a parallax amount between perspectives to thereby perform the foregoing three-dimensional effect enhancement processing, when the image signal Sgin is a three-dimensional (3D) signal, for example. The foregoing processing that converts a parallax amount between perspectives may be referred to as a parallax amount conversion processing, for example.

FIG. 9 illustrates an example in which the three-dimensional effect enhancement processor 121A may perform the three-dimensional effect enhancement processing utilizing the cylindrical transformation processing out of the foregoing processing examples. More specifically, when the type Dc1 of the contact condition is determined to be one of the foregoing concave deformation state and the foregoing convex deformation state, the three-dimensional effect enhancement processor 121A may so perform the cylindrical transformation processing on the image expressed on the basis of the image signal Sgin, or an entire monochrome image, illustrated in Part (A) of FIG. 9 as to allow a curvature of the image after the cylindrical transformation processing to be greater than an actual curvature of the image that has been displayed in accordance with the type Dc1 of the contact condition, thereby performing the three-dimensional effect enhancement processing. This allows for generation of the image signal Sg1 that has been subjected to the foregoing three-dimensional effect enhancement processing, when the type Dc1 of the contact condition is either the concave deformation state or the convex deformation state, as illustrated in Parts (B) and (D) of FIG. 9, for example. It is to be noted that a black region may be inserted around the original image in both of the cases illustrated in Parts (B) and (D) of FIG. 9 in the present example embodiment. Further, image display may be performed by the display section 10 on the basis of the image signal Sg1 thus generated, thereby enhancing the three-dimensional effect in accordance with the type Dc1 of the contact condition in either the concave deformation state or the convex deformation state, as illustrated in Parts (C) and (E) of FIG. 9, for example. The foregoing three-dimensional effect may be a sense of depth, for example.

Thereafter, the definition compensator 121B may perform a definition compensation processing on the image signal Sg1 thus generated, thereby generating the image signal Sg2 that has been subjected to the definition compensation processing. The definition compensation processing may be a processing that compensates for the decreased resolution of the image due to the foregoing three-dimensional effect enhancement processing as described above. In other words, the definition compensation processing may be a processing that compensates for the decreased resolution of the image expressed on the basis of the image signal Sg1. More specifically, the definition compensator 121B may so perform an image processing as to suppress a decrease in resolution, or definition, of a region such as a peripheral region, due to expansion, or enlarging, and of the image by means of a processing such as the geometric transformation processing, the processing that adds a motion parallax, and the parallax amount conversion processing described above, for example. Namely, the definition compensation processing may be an image processing accompanying the three-dimensional effect enhancement processing. It is to be noted that the foregoing definition compensation processing may be performed by means of an image interpolation processing that uses one of linear interpolation and non-linear interpolation.

Thereafter, the contrast enhancement processor 121C may perform the contrast enhancement processing on the image signal Sg2 thus generated, thereby generating the image signal Sg3 (Sgout) that has been subjected to the contrast enhancement processing. The contrast enhancement processor 121C may perform, as the contrast enhancement processing, a processing that enhances each of the luminance contrast and the chroma contrast in accordance with the contact condition in which the user makes contact with the display section 10 as described above, in the present example embodiment.

Figure 10:
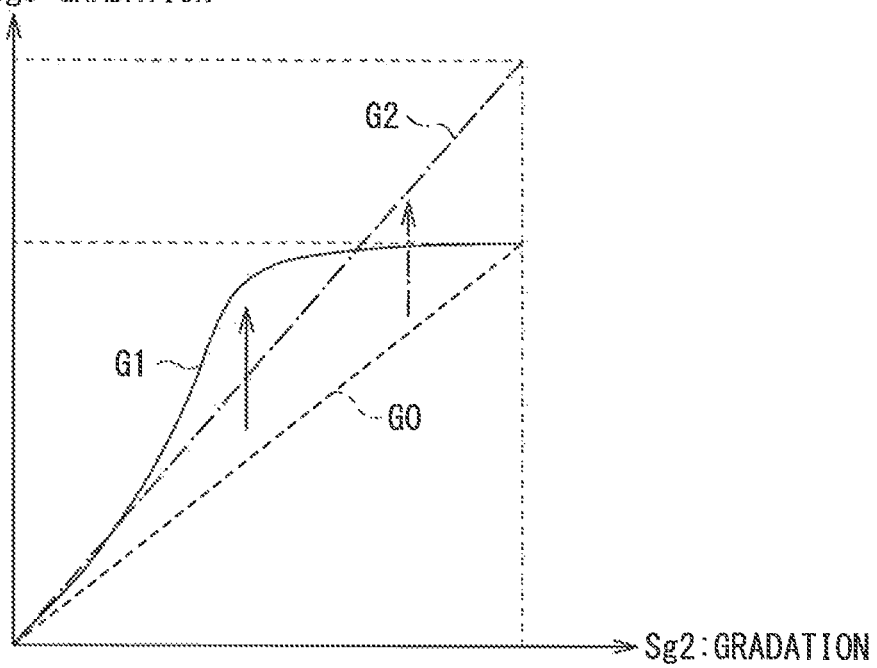
FIG. 10 is a schematic diagram illustrating an example of an enhancement processing on luminance contrast referred to in FIG. 1.

More specifically, the contrast enhancement processor 121C may perform a so-called raising processing on luminance, thereby performing the enhancement processing on the luminance contrast, as schematically illustrated in FIG. 10, for example. The raising processing on luminance is a processing that increases the luminance. More specifically, the contrast enhancement processor 121C may convert a characteristic line G0 that expresses a relationship of a gradation level between the image signals Sg2 and Sg3 into a characteristic line G1 that has been subjected to the raising processing, thereby performing the foregoing enhancement processing on the luminance contrast, for example, as illustrated by a solid-line arrow in FIG. 10. The characteristic line G0 may be a straight line. The characteristic line G1 may be a curved line. Alternatively, the contrast enhancement processor 121C may perform the following processing when a maximum value of a dynamic range of the luminance in the display section 10 is allowed to be increased, i.e., when the self-emitting element such as the organic EL element is used as the display element. More specifically, the contrast enhancement processor 121C may convert the characteristic line G0 into a characteristic line G2 having a slope that is greater than a slope of the characteristic line G0, thereby performing the enhancement processing on the luminance contrast, for example, as illustrated by a dashed-and-dotted-line arrow in FIG. 10. The characteristic line G2 may be a straight line. It is to be noted that the foregoing enhancement processing on the luminance contrast may be applied to a partial pixel region in a display screen, or to an entire region in the display screen, for example. The partial pixel region may be a pixel region that is to be focused on, for example, a middle part of the display screen.

Figure 11:
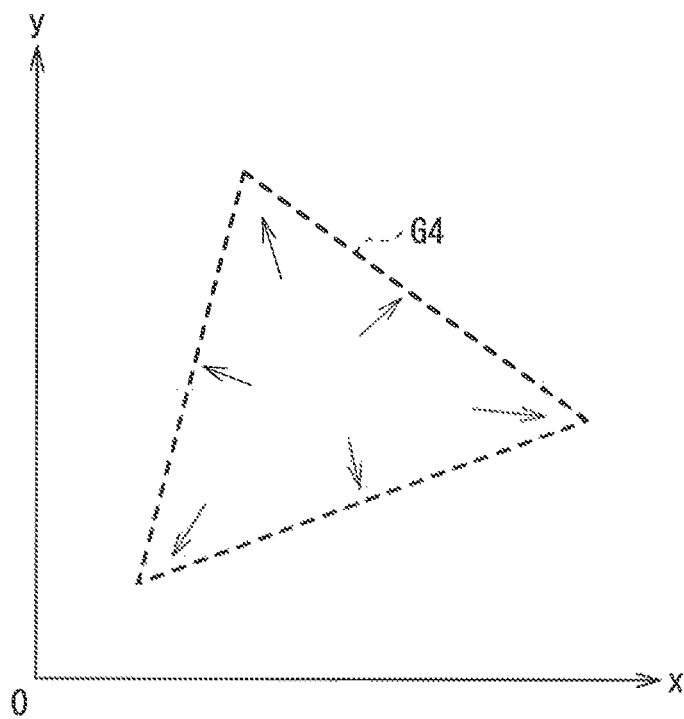
FIG. 11 is a schematic diagram illustrating an example of an enhancement processing on chroma contrast referred to in FIG. 1.

Further, the contrast enhancement processor 121C may perform a so-called raising processing on chroma, thereby performing the enhancement processing on the chroma contrast, as schematically illustrated in FIG. 11, for example. The raising processing on chroma is a processing that increases the chroma. More specifically, the contrast enhancement processor 121C may perform the enhancement processing on the chroma contrast by so increasing the chroma of the image expressed on the basis of the image signal Sg2 in a physical color gamut G4 in the display section 10 as illustrated in FIG. 11, as to widen a color gamut of the image displayed on the display section 10, for example, as illustrated by arrows in FIG. 11. The contrast enhancement processor 121C may thereby perform the enhancement processing on the chroma contrast. It is to be noted that the foregoing enhancement processing on the chroma contrast may also be applied to a partial pixel region in the display screen, or to the entire region in the display screen, for example. The partial pixel region may be a pixel region that is to be focused on, for example, the middle part of the display screen.

[Workings and Effects]

The present example embodiment may have the foregoing configuration in which the enhancement processing is performed on the image signal in accordance with the contact condition in which the user makes contact with the display section 10, thereby making it possible for the user to intuitively comprehend the image enhancement. In other words, it is possible to provide a powerful image with a sense of presence, or an absorbed feeling, that is appropriate for the operation, or the contact condition, of the user.

More specifically, the enhancement processing is performed in accordance with the detected contact condition, or a direction of the stress, by means of an image processing in a way opposite to a way of the existing image processing. This improves the factor such as the sense of presence so that the factor is appropriate for the detected contact condition. In contrast, the existing technique involves an image processing that compensates for the image expressed on the basis of the detected deformation so that the image is easily viewed by the user. In other words, the existing technique involves an image processing that reduces influence of the deformation. This degrades the factor such as the sense of presence, which is the opposite to the present example embodiment.

According to the present example embodiment, the enhancement processing is performed on the image signal in accordance with the contact condition in which the user makes contact with the display section 10. This makes it possible for the user to intuitively comprehend the image enhancement. As a result, it is possible to improve the sense of presence, or the absorbed feeling, that is provoked during the image display.

Moreover, the foregoing image processing, or the enhancement processing, is performed utilizing the stress Ds detected by the stress sensor 11. This makes it possible to achieve the following effect, which may not be achieved in a case of performing detection of a deformation state of the display section 10 and utilizing a result of the detection, for example. That is, it is possible to execute the foregoing image processing even when the contact condition involves no deformation of the display section 10 or involves only a little amount of deformation of the display section 10, for example. Non-limiting example of the case where the contact condition involves only a little amount of deformation of the display section 10 may be a case where the deformation of the display section 10 is limited.

Moreover, it is possible to give visual feedback to the user by performing the image processing that enhances the influence of the contact condition of the user, utilizing the detected stress Ds as described above. For example, it may be thereby possible to suppress excessive deformation of the display section 10 due to the contact of the user. In other words, it may be possible to prevent the display section 10 from being bent excessively due to the contact of the user, for example.

2. Modifications

Next, modifications of the foregoing example embodiment, i.e., Modifications 1 to 3 are described. It is to be noted that components same as those in the example embodiment are denoted with the same numerals, and may not be further described where appropriate.

The description has been given of the case where the display unit 1 or the image processing device 12 of the present example embodiment has a configuration in which the image processor 121 includes all of the three processors, i.e., the three-dimensional effect enhancement processor 121A, the definition compensator 121B, and the contrast enhancement processor 121C. In other words, the image processor 121 may perform each of the foregoing three-dimensional effect enhancement processing, the foregoing compensation processing on the decreased resolution, and the foregoing contrast enhancement processing. However, the configuration of the display unit 1 (the image processing device 12) is not limited to the foregoing example embodiment. Alternatively, the display unit 1 or the image processing device 12 may include any of the following image processors according to Modifications 1 to 3, i.e., image processors 121-1 to 121-3, instead of the image processor 121, for example.

(Modification 1)

Figure 12A:
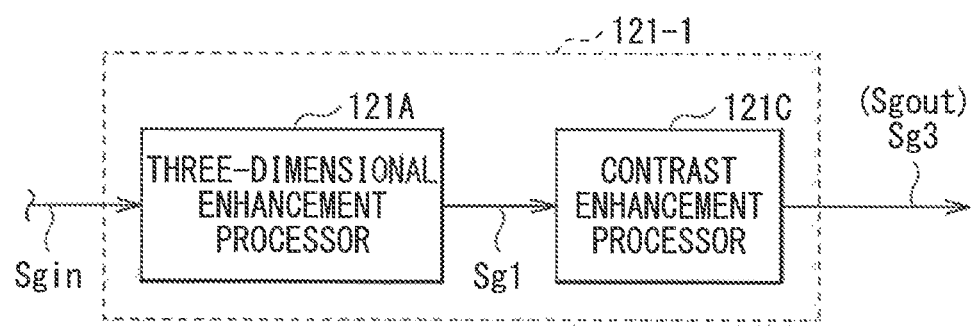
FIG. 12A is a block diagram illustrating an outline configuration example of an image processor according to Modification 1.

More specifically, referring to FIG. 12A, the image processor according to Modification 1, i.e., the image processor 121-1 may include two of the foregoing processors, i.e., the three-dimensional effect enhancement processor 121A and the contrast enhancement processor 121C, for example. In other words, the image processor 121-1 does not include the definition compensator 121B, unlike the image processor 121. Accordingly, the image processor 121-1 may have a configuration in which the three-dimensional effect enhancement processor 121A first performs the foregoing three-dimensional effect enhancement processing on the image signal Sgin, thereby generating the image signal Sg1 and outputting the generated image signal Sg1. Further, the contrast enhancement processor 121C may perform the foregoing contrast enhancement processing on the image signal Sg1 outputted by the three-dimensional effect enhancement processor 121A, thereby generating the image signal Sg3 and outputting the generated image signal Sg3 as the image signal Sgout.

(Modification 2)

Figure 12B:
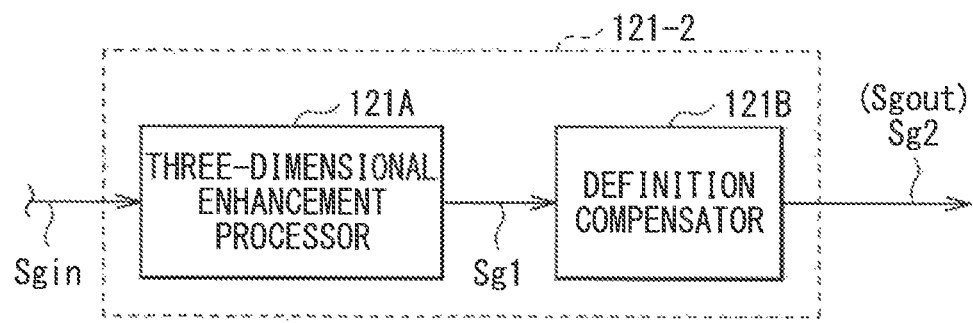
FIG. 12B is a block diagram illustrating an outline configuration example of an image processor according to Modification 2.

Alternatively, referring to FIG. 12B, the image processor according to Modification 2, i.e., the image processor 121-2 may include two of the foregoing processors, i.e., the three-dimensional effect enhancement processor 121A and the definition compensator 121B, for example. In other words, the image processor 121-2 does not include the contrast enhancement processor 121C, unlike the image processor 121. Accordingly, the image processor 121-2 may have a configuration in which the three-dimensional effect enhancement processor 121A first performs the foregoing three-dimensional effect enhancement processing on the image signal Sgin, thereby generating the image signal Sg1 and outputting the generated image signal Sg1. Further, the definition compensator 121B may perform the foregoing compensation processing on the decreased resolution of the outputted image signal Sg1, thereby generating the image signal Sg2 and outputting the generated image signal Sg2 as the image signal Sgout.

(Modification 3)

Figure 12C:
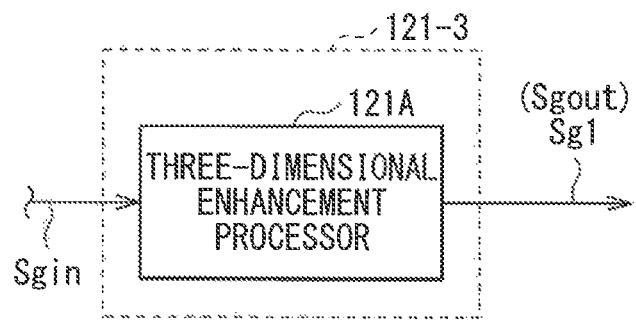
FIG. 12C is a block diagram illustrating an outline configuration example of an image processor according to Modification 3.

Alternatively, referring to FIG. 12C, the image processor according to Modification 3, i.e., the image processor 121-3 may include only one of the foregoing processors, i.e., the three-dimensional effect enhancement processor 121A, for example. In other words, the image processor 121-3 does not include the definition compensator 121B and the contrast enhancement processor 121C, unlike the image processor 121. Accordingly, the image processor 121-3 may have a configuration in which the three-dimensional effect enhancement processor 121A performs the foregoing three-dimensional effect enhancement processing on the image signal Sgin, thereby generating the image signal Sg1 and outputting the generated image signal Sg1 as the image signal Sgout.

Also according to the foregoing Modifications 1 to 3, the enhancement processing, at least the foregoing three-dimensional effect enhancement processing, is performed on the image signal in accordance with the contact condition in which the user makes contact with the display section 10, as with the example embodiment. Accordingly, it is possible to improve the sense of presence, or the absorbed feeling, that is provoked during the image display.

3. Application Example

Next, a description is given of an application example in which the image processing device or the display unit including any of the image processors 121 and 121-1 to 121-3 according to the foregoing example embodiment and the foregoing Modifications 1 to 3 is applied to an electronic apparatus.

Figure 13:
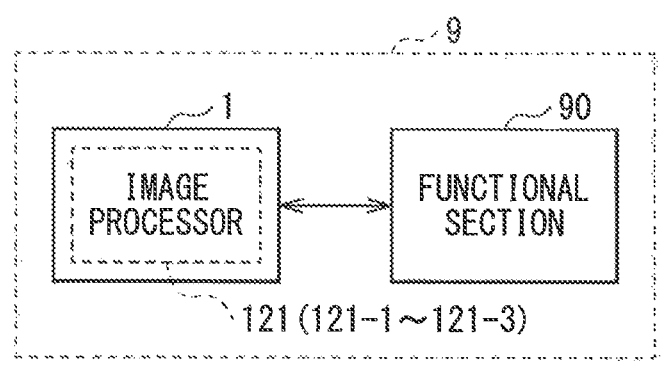
FIG. 13 is a block diagram illustrating an outline configuration example of an electronic apparatus according to an application example.

FIG. 13 is a block diagram illustrating an outline configuration example of an electronic apparatus according to the present application example, i.e., an electronic apparatus 9. The electronic apparatus 9 may include the display unit 1 and a functional section 90. The display unit 1 includes any one of the image processors 121 and 121-1 to 121-3. The functional section 90 may allow various functions of the electronic apparatus 9 to be exhibited.

Non-limiting examples of the electronic apparatus 9 may include various mobile apparatuses such as an electronic book, a laptop personal computer (PC), a tablet PC, a mobile game instrument, a mobile audio player, a mobile video player, a mobile phone, a smartphone, and a wearable terminal. The non-limiting examples of the electronic apparatus 9 may also include a TV apparatus or a television receiver, an illumination apparatus, a digital signage, and a car navigation system, besides the foregoing mobile apparatuses.

4. Other Modifications

The technology of the disclosure has been described above referring to the example embodiment, the modifications thereof, and the application example thereof. However, the technology is not limited to the foregoing example embodiment, etc., and may be variously modified.

For example, the description above has been given referring to the specific configuration examples of the display unit and the electronic apparatus according to the foregoing example embodiment, etc. However, the configuration of the display unit and the electronic apparatus are not limited thereto. More specifically, a part of the foregoing configuration may be replaced by another configuration, or another configuration may be provided in addition to the foregoing configuration, for example. Moreover, the shape, the arrangement, the number, etc. of each of the components are not limited to those described above referring to the example embodiment, etc., and may be another shape, another arrangement, and another number, etc.

More specifically, the description has been given referring to the example in which the display section is the flexible display section, i.e., the example in which the display section has flexibility, according to the foregoing example embodiment, etc., for example. However, the display section is not limited to the flexible display section, and may be a non-flexible display section. In other words, the display section may have no flexibility.

Moreover, in terms of the contact condition in which the user makes contact with the display section, the technology is applicable not only to the contact condition in which the user makes contact with the display section at a plurality of points described above referring to the example embodiment, etc. The contact condition in which the user makes contact with the display section at a plurality of points may be a contact condition in which the user uses both of the user's hands, for example. The technology is also applicable to a contact condition in which the user makes contact with the display section at only one point. The contact condition in which the user makes contact with the display section at only one point may be a contact condition in which the user uses only one of the user's hands, for example. The stress gradient described above referring to the example embodiment, etc. is generated also in the case involving the contact condition in which the user makes contact with the display section at only one point, when the display section 10 is supported by a housing as in the application example in which the electronic apparatus 9 is the laptop PC, for example. Therefore, the foregoing analysis processing is applicable to the foregoing case. In contrast, when the display section 10 is not supported by a housing, or in any other case, the stress gradient described above referring to the example embodiment, etc. is not generated in the case of the contact condition in which the user makes contact with the display section at only one point. Accordingly, the foregoing analysis processing may be performed without utilizing the stress gradient in such a case. Moreover, the contact condition may be detected utilizing any type of detection other than the detection of the stress described above referring to the example embodiment, etc. For example, the contact condition may be detected utilizing detection of a deformation state of the display section.

Moreover, the description has been given in the foregoing example embodiment, etc. referring to the example in which the enhancement processing performed by the image processing device or the image processor includes at least the foregoing three-dimensional effect enhancement processing. However, this is not limitative. For example, the foregoing enhancement processing may not include the three-dimensional effect enhancement processing. More specifically, the foregoing enhancement processing may include at least one of the foregoing three-dimensional effect enhancement processing and the contrast enhancement processing, for example. The contrast enhancement processing may be the enhancement processing on one or both of the foregoing luminance contrast and the foregoing chroma contrast.

Moreover, the image processing device or the image processor may perform another enhancement processing, which is not limited to the foregoing enhancement processing.

Moreover, the analysis processing performed by the analyzer is not limited to the technique described in the foregoing example embodiment, etc. The analysis processing may be performed by another technique. Moreover, the description has been given in the foregoing example embodiment, etc. referring to the example in which the analyzer is provided in the image processing device. However, this is not limitative. For example, the analyzer may be provided outside the image processing device or in another device.

Moreover, a combination of any two or more of the various examples described above may be adopted.

It is to be noted that the effects described herein are mere examples. The effects of the disclosure are not limited thereto, and may include any other effect.

It is possible to achieve at least the following configurations from the above-described example embodiments of the disclosure.

(1)

An image processing device, including an image processor that performs an image processing on an image signal on a basis of a result of detection of a contact condition in which a user makes contact with a display section, the image processing including an enhancement processing performed on the image signal in accordance with the contact condition.

(2)

The image processing device according to (1), wherein the enhancement processing is a processing that enhances, in accordance with the contact condition, one or more of a three-dimensional effect, luminance contrast, and chroma contrast of an image expressed on a basis of the image signal.

(3)

The image processing device according to (2), wherein
the enhancement processing includes at least the processing that enhances the three-dimensional effect, and
the image processor further performs a processing that compensates for decreased resolution of the image due to the processing that enhances the three-dimensional effect.

(4)

The image processing device according to any one of (1) to (3), wherein the image processor performs the enhancement processing utilizing a result of detection of the stress that is generated on the display section due to the contact made by the user with the display section.

(5)

The image processing device according to (4), further including an analyzer that performs analysis of the result of the detection of the contact condition on a basis of a stress detected by a stress sensor, and supplies a result of the analysis to the image processer.

(6)

The image processing device according to (5), wherein
the analyzer generates stress distribution in the display section on the basis of the stress detected by the stress sensor, and
the analyzer performs analysis on each of a type and contact intensity of the contact condition on a basis of the generated stress distribution, and supplies a result of the analysis to the image processor, the type and the contact intensity of the contact condition being included in the result of the detection of the contact condition.

(7)

The image processing device according to (6), wherein
the analyzer determines each of a contact position at which the user makes the contact with the display section, the contact intensity, and a stress gradient in the display section, on the basis of the stress distribution, and
the analyzer determines the type of the contact condition on a basis of the contact position and the stress gradient.

(8)

The image processing device according to (7), wherein
the analyzer determines each of a coordinate of a local maximum value in the stress distribution, magnitude of the local maximum value in the stress distribution, and low frequency component distribution of the stress in the display section, on the basis of the stress distribution,
the analyzer determines the contact position on a basis of the coordinate of the local maximum value,
the analyzer determines the contact intensity on a basis of the magnitude of the local maximum value, and
the analyzer determines the stress gradient on a basis of the coordinate of the local maximum value and the low frequency component distribution of the stress.

(9)

A display unit, including:
a display section;
a detector that performs detection of a contact condition in which a user makes contact with the display section; and
an image processor that performs an image processing on an image signal on a basis of a result of the detection of the contact condition performed by the detector, the image processing including an enhancement processing performed on the image signal in accordance with the contact condition.

(10)

The display unit according to (9), wherein the image processor performs the enhancement processing utilizing a result of detection of a stress that is generated on the display section due to the contact made by the user with the display section.

(11)

The display unit according to (10), wherein
the detector includes a stress sensor and an analyzer,
the stress sensor detecting the stress generated on the display section, and
the analyzer performing analysis on a result of the detection of the contact condition on a basis of the stress detected by the stress sensor, and supplying a result of the analysis to the image processor.

(12)

The display unit according to any one of (9) to (11), wherein the display section has flexibility.

(13)

An electronic apparatus with a display unit, the display unit including:
a display section;
a detector that performs detection of a contact condition in which a user makes contact with the display section; and
an image processor that performs an image processing on an image signal on a basis of a result of the detection of the contact condition performed by the detector, the image processing including an enhancement processing performed on the image signal in accordance with the contact condition.

Although the technology has been described in terms of exemplary embodiments, it is not limited thereto. It should be appreciated that variations may be made in the described embodiments by persons skilled in the art without departing from the scope of the technology as defined by the following claims. The limitations in the claims are to be interpreted broadly based on the language employed in the claims and not limited to examples described in this specification or during the prosecution of the application, and the examples are to be construed as non-exclusive. For example, in this disclosure, the term "preferably", "preferred" or the like is non-exclusive and means "preferably", but not limited to. The use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" or "approximately" as used herein can allow for a degree of variability in a value or range. Moreover, no element or component in this disclosure is intended to be dedicated to the public regardless of whether the element or component is explicitly recited in the following claims.

What is claimed is:

1. An image processing device, comprising:
   an image processor that performs an image processing on an image signal on a basis of a result of detection of a contact condition in which a user makes contact with a display section, the image processing including an enhancement processing performed on the image signal in accordance with the contact condition,
   wherein the image processor performs the enhancement processing utilizing a result of detection of a stress that is generated on the display section due to the contact with the display section; and
   an analyzer that performs analysis of the result of the detection of the contact condition on a basis of the stress detected by a stress sensor, and supplies a result of the analysis to the image processor,
   wherein the analyzer generates a stress distribution of the display section on the basis of the stress detected by the stress sensor,
   the analyzer performs analysis on each of a type and contact intensity of the contact condition on a basis of the generated stress distribution, and supplies a result of the analysis to the image processor, the type and the contact intensity of the contact condition being included in the result of the detection of the contact condition,
   the analyzer determines each of a contact position at which the user makes the contact with the display section, the contact intensity, and a stress gradient in the display section, on the basis of the stress distribution, and
   the analyzer determines the type of the contact condition on a basis of the contact position and the stress gradient.

2. The image processing device according to claim 1, wherein the enhancement processing is a processing that enhances, in accordance with the contact condition, one or more of a three-dimensional effect, luminance contrast, and chroma contrast of an image expressed on a basis of the image signal.

3. The image processing device according to claim 2, wherein
   the enhancement processing includes at least the processing that enhances the three-dimensional effect, and
   the image processor further performs a processing that compensates for decreased resolution of the image due to the processing that enhances the three-dimensional effect.

4. The image processing device according to claim 1, wherein
   the analyzer determines each of a coordinate of a local maximum value in the stress distribution, magnitude of the local maximum value in the stress distribution, and low frequency component distribution of the stress in the display section, on the basis of the stress distribution,
   the analyzer determines the contact position on a basis of the coordinate of the local maximum value,
   the analyzer determines the contact intensity on a basis of the magnitude of the local maximum value, and
   the analyzer determines the stress gradient on a basis of the coordinate of the local maximum value and the low frequency component distribution of the stress.

5. A display unit, comprising:
   a display section;
   a detector that performs detection of a contact condition in which a user makes contact with the display section;
   an image processor that performs an image processing on an image signal on a basis of a result of the detection of the contact condition performed by the detector, the image processing including an enhancement processing performed on the image signal in accordance with the contact condition,
   wherein the image processor performs the enhancement processing utilizing a result of detection of a stress that is generated on the display section due to the contact with the display section; and
   an analyzer that performs analysis of the result of the detection of the contact condition on a basis of the stress detected by a stress sensor, and supplies a result of the analysis to the image processor,
   wherein the analyzer generates a stress distribution of the display section on the basis of the stress detected by the stress sensor,
   the analyzer performs analysis on each of a type and contact intensity of the contact condition on a basis of the generated stress distribution, and supplies a result of the analysis to the image processor, the type and the contact intensity of the contact condition being included in the result of the detection of the contact condition,
   the analyzer determines each of a contact position at which the user makes the contact with the display section, the contact intensity, and a stress gradient in the display section, on the basis of the stress distribution, and
   the analyzer determines the type of the contact condition on a basis of the contact position and the stress gradient.

6. The display unit according to claim 5, wherein the display section has flexibility.

7. An electronic apparatus with a display unit, the display unit comprising:
   a display section;
   a detector that performs detection of a contact condition in which a user makes contact with the display section;
   an image processor that performs an image processing on an image signal on a basis of a result of the detection of the contact condition performed by the detector, the image processing including an enhancement processing performed on the image signal in accordance with the contact condition,
   wherein the image processor performs the enhancement processing utilizing a result of detection of a stress that is generated on the display section due to the contact with the display section; and an analyzer that performs analysis of the result of the detection of the contact condition on a basis of the stress detected by a stress sensor, and supplies a result of the analysis to the image processor, wherein the analyzer generates a stress distribution of the display section on the basis of the stress detected by the stress sensor, the analyzer performs analysis on each of a type and contact intensity of the contact condition on a basis of the generated stress distribution, and supplies a result of the analysis to the image processor, the type and the contact intensity of the contact condition being included in the result of the detection of the contact condition, the analyzer determines each of a contact position at which the user makes the contact with the display section, the contact intensity, and a stress gradient in the display section, on the basis of the stress distribution, and the analyzer determines the type of the contact condition on a basis of the contact position and the stress gradient.

8. The display unit according to claim 5, wherein the enhancement processing is a processing that enhances, in accordance with the contact condition, one or more of a three-dimensional effect, luminance contrast, and chroma contrast of an image expressed on a basis of the image signal.

9. The display unit according to claim 8, wherein
the enhancement processing includes at least the processing that enhances the three-dimensional effect, and
the image processor further performs a processing that compensates for decreased resolution of the image due to the processing that enhances the three-dimensional effect.

10. The display unit according to claim 5, wherein
the analyzer determines each of a coordinate of a local maximum value in the stress distribution, magnitude of the local maximum value in the stress distribution, and low frequency component distribution of the stress in the display section, on the basis of the stress distribution,
the analyzer determines the contact position on a basis of the coordinate of the local maximum value,
the analyzer determines the contact intensity on a basis of the magnitude of the local maximum value, and
the analyzer determines the stress gradient on a basis of the coordinate of the local maximum value and the low frequency component distribution of the stress.

11. The electronic apparatus according to claim 7, wherein the enhancement processing is a processing that enhances, in accordance with the contact condition, one or more of a three-dimensional effect, luminance contrast, and chroma contrast of an image expressed on a basis of the image signal.

12. The electronic apparatus according to claim 11, wherein
the enhancement processing includes at least the processing that enhances the three-dimensional effect, and
the image processor further performs a processing that compensates for decreased resolution of the image due to the processing that enhances the three-dimensional effect.

13. The electronic apparatus according to claim 7, wherein
the analyzer determines each of a coordinate of a local maximum value in the stress distribution, magnitude of the local maximum value in the stress distribution, and low frequency component distribution of the stress in the display section, on the basis of the stress distribution,
the analyzer determines the contact position on a basis of the coordinate of the local maximum value,
the analyzer determines the contact intensity on a basis of the magnitude of the local maximum value, and
the analyzer determines the stress gradient on a basis of the coordinate of the local maximum value and the low frequency component distribution of the stress.

* * * * *